United States Patent
Rezeanu et al.

(10) Patent No.: US 10,312,730 B2
(45) Date of Patent: Jun. 4, 2019

(54) EMERGENCY LIGHTING SYSTEM AND METHOD FOR AUTOMATIC HEATING POWER EQUALIZATION

(71) Applicant: SIGNIFY HOLDING B.V., Eindhoven (NL)

(72) Inventors: Stefan-Cristian Rezeanu, Collierville, TN (US); Jon P. Baker, Memphis, TN (US); Long Wang, Collierville, TN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/306,629

(22) PCT Filed: Apr. 23, 2015

(86) PCT No.: PCT/IB2015/052960
§ 371 (c)(1),
(2) Date: Oct. 25, 2016

(87) PCT Pub. No.: WO2015/166386
PCT Pub. Date: Nov. 5, 2015

(65) Prior Publication Data
US 2017/0047774 A1 Feb. 16, 2017

Related U.S. Application Data

(60) Provisional application No. 61/985,639, filed on Apr. 29, 2014.

(51) Int. Cl.
*H02J 9/06* (2006.01)
*H01M 10/48* (2006.01)
(Continued)

(52) U.S. Cl.
CPC ........... *H02J 9/065* (2013.01); *H01M 10/486* (2013.01); *H01M 10/615* (2015.04);
(Continued)

(58) Field of Classification Search
CPC ........ H02J 7/0091; H02J 9/065; H02J 7/0013; H02J 7/0055; H02J 7/02; H02J 7/047;
(Continued)

(56) References Cited

U.S. PATENT DOCUMENTS 5,004,953 A * 4/1991 McDonald ......... H05B 41/2853
  315/171
6,753,651 B1  6/2004 Goral
  (Continued)

FOREIGN PATENT DOCUMENTS

CN  102842935 A  12/2012
JP  2010165593 A  7/2010
(Continued)

*Primary Examiner* — Hal Kaplan
*Assistant Examiner* — Elim Ortiz
(74) *Attorney, Agent, or Firm* — Akarsh P. Belagodu

(57) ABSTRACT

An apparatus and method employ a pair of input terminals to receive an input voltage from a charging power source for charging a backup power supply for an emergency lighting system, the input voltage corresponding to any one of a plurality of nominal operating voltages. A voltage level detector produces, in response to the received input voltage, an input voltage level signal indicating which of the nominal operating voltages is being received. A temperature detector determines whether the temperature of the backup power supply exceeds a threshold and produces a temperature signal in response thereto. A heater includes a plurality of heating elements, and is activated to heat the backup power supply when the temperature of the backup power supply is less than the threshold. The input voltage level signal determines which of the heating elements is activated.

20 Claims, 8 Drawing Sheets

(51) Int. Cl.
*H01M 10/615* (2014.01)
*H01M 10/6571* (2014.01)
*H02J 7/00* (2006.01)
*H02J 9/02* (2006.01)
*H05B 37/02* (2006.01)
*H02J 7/02* (2016.01)
*H01M 10/627* (2014.01)
*H02J 7/04* (2006.01)
*H05B 1/02* (2006.01)

(52) U.S. Cl.
CPC ..... *H01M 10/627* (2015.04); *H01M 10/6571* (2015.04); *H02J 7/0013* (2013.01); *H02J 7/0055* (2013.01); *H02J 7/02* (2013.01); *H02J 7/047* (2013.01); *H02J 9/02* (2013.01); *H05B 1/0202* (2013.01); *H05B 1/023* (2013.01); *H05B 37/0209* (2013.01)

(58) Field of Classification Search
CPC ...... H02J 9/02; H01M 10/615; H01M 6/5038; H01M 10/486; H01M 10/627; H01M 10/6571; H05B 37/04; H05B 1/0202; H05B 1/023; H05B 37/0209

See application file for complete search history.

(56) References Cited

U.S. PATENT DOCUMENTS

| | | | |
|---|---|---|---|
| 6,870,140 B2 * | 3/2005 | Cook | G03G 15/2039 219/216 |
| 6,987,363 B1 * | 1/2006 | Goral | H02J 9/065 307/64 |
| 7,800,311 B2 | 9/2010 | Chiba et al. | |
| 2004/0232137 A1 | 11/2004 | Cook et al. | |
| 2008/0191628 A1 | 8/2008 | Marques et al. | |

FOREIGN PATENT DOCUMENTS

WO WO2008064008A2 A2 5/2008
WO WO2013045709 A2 4/2013

* cited by examiner

EMERGENCY LIGHTING SYSTEM AND METHOD FOR AUTOMATIC HEATING POWER EQUALIZATION

CROSS-REFERENCE TO PRIOR APPLICATIONS

This application is the U.S. National Phase application under 35 U.S.C. § 371 of International Application No. PCT/IB2015/052960, filed on Apr. 23, 2015, which claims the benefit of U.S. Patent Application No. 61/985,639, filed on Apr. 29, 2014. These applications are hereby incorporated by reference herein.

TECHNICAL FIELD

The present invention is directed generally to an emergency lighting system. More particularly, various inventive methods and apparatus disclosed herein relate to an emergency lighting system with automatic equalization of the power used to heat a backup power supply, for example a battery, for the emergency lighting system for any of a plurality of different input voltages which may be used to charge the backup power supply.

BACKGROUND

Emergency lighting has been employed for several decades, for example to provide power to one or more light sources for illumination of the path of egress from a building or facility. Emergency lighting is required in industrial, commercial, and institutional buildings as part of the safety equipment. Emergency lighting relies on a limited backup power source for example a battery, to supply power to the light source(s). Here, "a battery" is understood to encompass a plurality of individual battery units connected together to function as one backup power source. An emergency lighting system (sometimes referred to as an "emergency ballast") is designed to energize the light source(s) exclusively during periods of AC power failure, when the emergency lighting system is said to be in "emergency mode" (EM), and may be combined with a conventional lighting unit (sometimes referred to as an "AC ballast"). The emergency lighting system may sense the absence of the AC power and use the backup power source and dedicated electronic circuitry to energize the light source(s) during a limited period of AC power failure. In the USA, the required emergency lighting period is at least 90 minutes, while in Europe, e.g., it is 180 minutes, during which the emergency illumination level should not decline to under 60% of the initial level, as set for battery-powered emergency lighting systems by the life safety codes (e.g., section 7.9.2 of NFPA-101 and NEC 700.12).

Recently, light-emitting diodes (LEDs) have become more prominent in the market as a main light source for an occupied space. LEDs offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. These advantages are leading to the introduction of LEDs into a wide variety of applications and context. In particular, LED light sources are now being developed for use in emergency lighting systems.

In order to be able to provide the necessary amount of energy during the EM discharge, the battery is customarily charged for a period of time of at least 24 h, during which it should accept charge at an optimum rate no matter what temperatures (within a specified range) the emergency lighting system is subjected to. Especially for emergency lighting systems designed to operate at ambient temperatures below 0° C. (e.g., unheated garages, outside staircases, etc.), a means to warm up the batteries—generally only necessary during the charging phase—may be provided. Thus, the normal 0° C. low end ambient temperature limit of the emergency lighting system may be extended to −20° C. or less, without exposing the battery to the threat of explosion due to a potential build-up of hydrogen gases—which is known to occur with the typically used nickel-cadmium (NiCd) rechargeable batteries if full-charging is attempted while the batteries are frozen.

Furthermore, it is desired to be able to install a particular emergency lighting system in a variety of locations and to be able to connect it to a variety of different commonly encountered nominal AC voltages, for example 120 VAC, 230 VAC, 277 VAC, etc. However, accommodating such a wide range of possible input voltages can present a problem for the battery heater because the power dissipated by the heater varies as the square of the voltage. If the heater is designed to provide sufficient heating energy to the battery at the lowest expected input voltage, then when it receives a much higher input voltage the power dissipation may be excessive and may cause the heater to become too hot in which case it may cause irreversible damage to the surrounding material and/or may need to be shut down. Conversely, if the heater is designed to operate safely and without overheating at the highest expected input voltage, then when it receives a much lower input voltage the amount of heat dissipation may be insufficient to adequately and effectively heat the battery.

Thus, there is a need in the art to provide an emergency lighting system, and particularly to LED emergency lighting, wherein an LED lamp is connected to a source of DC current (possibly a combination of DC with a much smaller amplitude AC component added to it) which is able to energize the LED lamp load in the event of an AC power failure. In particular, there is a need to provide a solution for ensuring that a backup power source (e.g., a battery—generally residing inside the emergency lighting system) is not only maintained at a safe and effective operating temperature during charging (i.e., during the time that the emergency lighting system is powered by the AC power), but also that automatically equalizes the battery heating power for different commonly encountered nominal operating voltages (e.g., 120 VAC and 277 VAC in the United States, 230 VAC in Europe, etc). Furthermore, it would be desirable to provide such a solution which can not only ensure that the battery optimally accept charge no matter what the nominal AC voltage is at the particular emergency lighting system installation location, but also can eliminate the need for additional external wires for powering the battery heater. It would also be desirable to provide such a solution which allows the same emergency lighting system to be connected to a charging power source (e.g., AC mains) having any one of a plurality of different nominal operating voltages without the need for flipping or setting an input voltage selection switch to match the nominal operating voltage and/or connecting the charging power source to one or more different input terminals depending on the nominal operating voltage.

SUMMARY

The present disclosure is directed to inventive methods and apparatus for an emergency lighting system. For example, the present disclosure describes embodiments of an emergency lighting system with automatic equalization of the power used to heat a backup power supply, for example a battery, for the emergency lighting system for a plurality of different input voltages which may be used to charge the backup power supply.

Generally, in one aspect, an apparatus comprises: first and second input terminals configured to be connected to a charging power source for charging a backup power supply for an emergency lighting system and to receive an input voltage from a charging power source across the first and second input terminals, the input voltage corresponding to an applied nominal operating voltage of the charging power source among a plurality of nominal operating voltages for the emergency lighting system; a voltage level detector configured to produce, in response to the received input voltage, an input voltage level signal indicating the applied nominal operating voltage of the charging power source to which the input voltage corresponds; a temperature detector configured to determine whether a temperature in a vicinity of the backup power supply exceeds a backup power supply temperature threshold and to produce a temperature signal indicating whether the temperature exceeds the backup power supply temperature threshold; and a heater including a plurality of heating elements configured to be selectively activated to heat the backup power supply, wherein the temperature signal determines whether the heater is activated, and when the heater is activated the input voltage level signal determines which of the heating elements is/are activated.

In some embodiments, the apparatus further comprises a switching circuit, wherein the switching circuit is configured to activate the heater when the temperature does not exceed the backup power supply temperature threshold.

In some variations of these embodiments, the heater has a plurality of voltage inputs and an output terminal, wherein the switching circuit is further configured to selectively connect the first input terminal to a selected one of a plurality of voltage inputs in response to the input voltage level signal when the temperature does not exceed the backup power supply temperature threshold.

In some variations of these embodiments, the switching circuit comprises one or more relays configured to activate the heater when the temperature does not exceed the backup power supply temperature threshold, and further configured to connect the first input terminal to the selected voltage input in response to the input voltage level signal when the temperature does not exceed the backup power supply temperature threshold.

In some variations of these embodiments, the apparatus further comprises a logic circuit configured to receive the input voltage level signal and the temperature signal and in response thereto to output one or more control signals for controlling the one or more relays.

In some variations of these embodiments, the heater has a plurality of voltage inputs, and an output terminal, wherein at least a first one of the heating elements is connected in series between a first voltage input and a second voltage input, and at least a second one of the heating elements is connected in series between the second voltage input and the output terminal, wherein the output terminal is connected to the second input terminal, and wherein the switching device is configured to selectively connect the first input terminal to one of the plurality of voltage inputs.

In some variations of these embodiments, when the heater is activated and the applied nominal operating voltage is a first one of the plurality of nominal voltages, then the switching circuit applies the input voltage across a series combination of first and second heating elements of the heater, and when the heater is activated and the applied nominal operating voltage is a second one of the plurality of nominal voltages, then the switching circuit applies the input voltage across the second heating element and bypasses the first heating element.

In some variations of these embodiments, the first nominal operating voltage is 277 VAC, and the second nominal operating voltage is 120 VAC, wherein the heater is configured to dissipate energy at a first power level when the heater is activated and the applied nominal operating voltage is 277 VAC, and wherein the heater is configured to dissipate energy at a second power level when the heater is activated and the applied nominal operating voltage is 120 VAC, wherein the first power level is approximately the same as the second power level.

In some variations of these embodiments, when the heater is activated and the applied nominal operating voltage is a first one of the plurality of nominal voltages, then the switching circuit applies the input voltage across a series combination of first, second and third heating elements of the heater, when the heater is activated and the applied nominal operating voltage is a second one of the plurality of nominal voltages, then the switching circuit applies the input voltage across a series combination of the second and third heating element and bypasses the first heating element, and when the heater is activated and the applied nominal operating voltage is a third one of the plurality of nominal voltages, then the switching circuit applies the input voltage across the third heating element and bypasses the first and second heating elements.

In some variations of these embodiments, the first nominal operating voltage is 277 VAC, the second nominal operating voltage is 230 VAC, and the third nominal operating voltage is 120 VAC.

In some embodiments, the plurality of nominal operating voltages includes at least 120 VAC and 277 VAC.

In some embodiments, the plurality of nominal operating voltages includes at least 120 VAC, 230 VAC and 277 VAC.

In some variations of these embodiments, the heater is configured to dissipate energy at a first power level when the heater is activated and the input voltage is 305 VAC, and wherein the heater is configured to dissipate energy at a second power level when the heater is activated and the input voltage is 102 VAC, wherein the first power level is less than twice the second power level, for nominal heater component values.

In some embodiments, the heater further includes a thermal protector configured to disable heating of the backup power supply when a temperature in a vicinity of the thermal protector exceeds a heater temperature threshold.

In some embodiments, the temperature detector is configured to vary the backup power supply temperature threshold to provide hysteresis for the temperature signal.

In another aspect, a method comprises: receiving across first and second input terminals an input voltage from a charging power source for charging a backup power supply for an emergency lighting system, the input voltage corresponding to an applied nominal operating voltage of the charging power source among a plurality of nominal operating voltages for the emergency lighting system; determining whether a temperature in a vicinity of the backup power supply exceeds a threshold; producing a temperature signal indicating whether the temperature exceeds the threshold; in response to the temperature signal, selectively activating and deactivating a heater comprising a plurality of heating elements; and when the heater is activated, producing an input voltage level signal indicating the applied nominal operating voltage of the charging power source to which the input voltage corresponds, and selecting, in response to the input voltage signal, one or more of the heating elements to activate to heat the backup power supply.

In some embodiments, when the temperature does not exceed the threshold, none of the heating elements is activated.

In some embodiments, the heater has a plurality of voltage inputs and an output terminal, the method further comprising selectively connecting the first input terminal to a selected one of a plurality of voltage inputs in response to the input voltage level signal.

In some embodiments, the method further comprises, when the heater is activated and the applied nominal operating voltage is a first one of the plurality of nominal voltages, applying the input voltage across a series combination of first and second heating elements of the heater, and when the heater is activated and the applied nominal operating voltage is a second one of the plurality of nominal voltages, applying the input voltage across the second heating element and bypasses the first heating element.

In some variations of these embodiments, the first nominal operating voltage is 277 VAC, and the second nominal operating voltage is 120 VAC, and the method further comprises: the heater dissipating energy at a first power level when the heater is activated and the applied nominal operating voltage is 277 VAC; and the heater dissipating energy at a second power level when the heater is activated and the applied nominal operating voltage is 120 VAC, wherein the first power level is approximately the same as the second power level.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In general, an emergency lighting system is connected to a charging power source for charging up a backup power source which is employed by the emergency lighting system when it is activated to provide illumination. A heater is often employed to heat the backup power source during its charging cycle to prevent damage or even an explosion. Depending on the particular installation, the charging power source may output any one of a plurality of nominal operating voltages (e.g., 120 VAC, 230 VAC, 277 VAC, etc.). However, the large variation in the voltage levels of the charging power source across the range of possible nominal operating voltages means an even greater, and undesirably large, variation in the amount of power dissipated by the heater if no other measures are taken.

More generally, Applicants have recognized and appreciated that it would be beneficial and that there is a need in the art to provide an emergency lighting system which can automatically adapt itself to operate its heater with any one of a plurality of possible nominal operating voltages which may be applied to its input terminals without the need for special measures such as setting an input voltage selector switch and/or connecting the charging power source to different input terminals depending on its nominal operating voltage, etc.

In view of the foregoing, various embodiments and implementations of the present invention are directed to methods and apparatus for an emergency lighting system with automatic equalization of the power used to heat a backup power supply, for example a battery, for the emergency lighting system for any of a plurality of different input voltages which may be used to charge the backup power supply.

Figure 1:
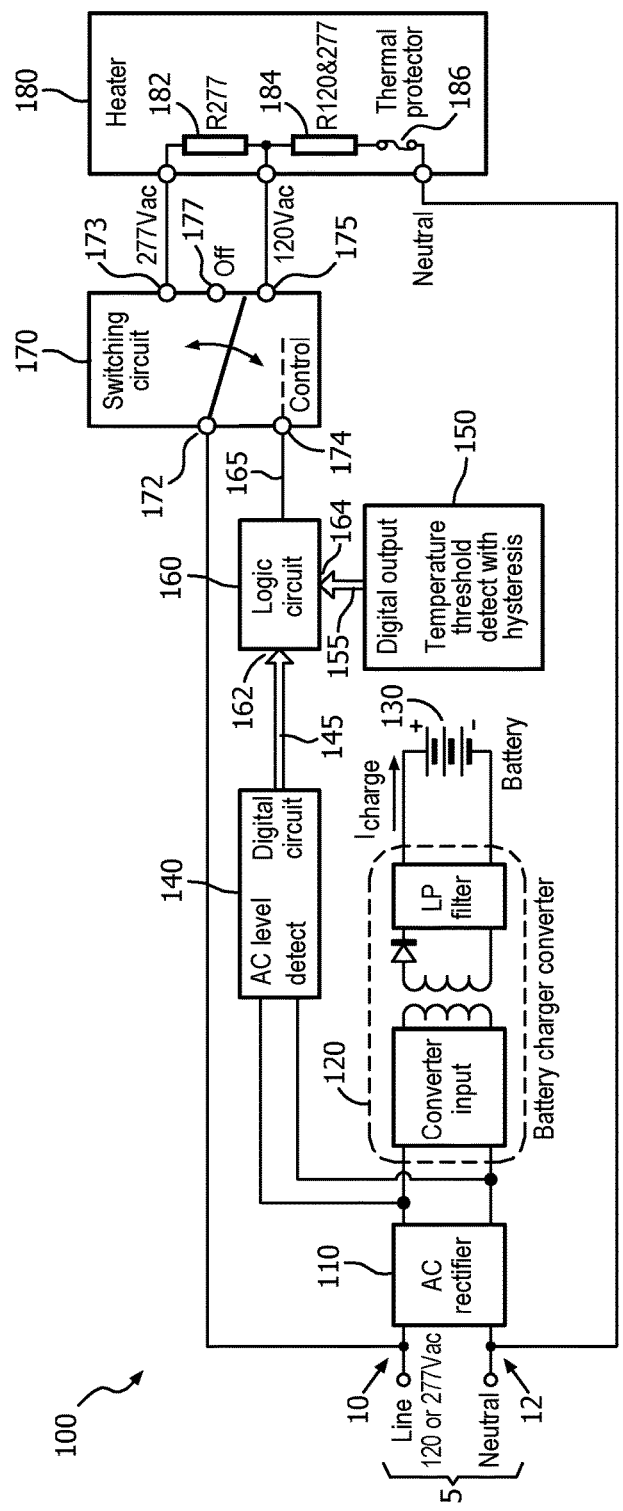
FIG. 1 illustrates a functional block diagram of a first embodiment of a portion of an emergency lighting system.

FIG. 1 illustrates a functional block diagram of a first embodiment of a portion of an emergency lighting system 100. In general, emergency lighting system 100 includes many other components not illustrated in FIG. 1, which may include one of more lighting fixtures and/or lighting units which in some embodiments, may include one or more LED light sources and one or more associated AC lighting drivers or ballasts. In some embodiments, the one or more LED light sources may be configured to emit substantially white light or light having any other desired color for illuminating a particular area. In particular, emergency lighting system 100 may be configured to provide illumination of a particular area at a specified intensity level for a specific time period in the event of loss of AC Mains power.

Emergency lighting system 100 includes first and second input terminals 10 and 12. Emergency lighting system 100 also includes an AC rectifier 110, a charger converter 120, a backup power supply (e.g., a battery 130), an AC voltage level detector 140, a temperature level/threshold detector 150, a logic circuit (e.g., a logic combiner circuit) 160, a switching circuit 170, and a heater 180. Although the backup power supply will typically be a battery 130 and will be described as such in the description to follow, it is conceived that it may be possible that another rechargeable backup power supply may be used, such as a capacitor bank or other technology which may yet to be developed. Those skilled in the art will easily appreciate how the operating principles of the embodiments described below may be generally applied to such backup power supplies.

Emergency lighting system 100 is configured to receive from a charging power source (e.g., AC Mains) (not shown) an input voltage 5 which is applied across first and second input terminals 10 and 12. Input voltage 5 corresponds to an applied nominal operating voltage of the charging power source among a plurality of nominal operating voltages with which emergency lighting system 100 may operate.

Here, a "nominal operating voltage" refers to a standard voltage level which may be provided from the charging power source to supply power for charging battery 130. The term recognizes that the actual voltage level from such a charging power source may vary by a few percent at any given time or place from the nominal or standard value. For example, when the charging power source is AC Mains, then the applied nominal operating voltage may be any one of a plurality of possible nominal operating voltages which may be supplied as AC Mains and with which emergency lighting system 100 may operate. More specifically, in various countries and for various installations, AC Mains may have any one of a plurality of possible nominal operating voltages such as 120 VAC, 230 VAC, 277 VAC, 400 VAC, etc. However, as noted above, it is understood that the actual voltage at any given time or place from the nominal or standard value. For example, with a nominal operating voltage of 120 VAC, the actual voltage at any given place or time may vary between 102 VAC (120V−15%) and 132 VAC (120+10%), or even in some rare cases over a wider range. However, each of the actual voltages will be referred to herein as a nominal operating voltage of 120 VAC. Furthermore, a nominal operating voltage of 120 VAC as used herein also encompasses regions and countries where the specified AC Mains voltage is 110 VAC, 115 VAC, or 127 VAC. Likewise, a nominal operating voltage of 230 VAC as used herein also encompasses regions and countries where the specified AC Mains voltage is 220 VAC or 240 VAC.

Emergency lighting system 100 is configured to operate with a plurality of nominal operating voltages, in particular 120 VAC and 277 VAC. However, it should be understood that in other embodiments, an emergency lighting system may be configured to operate with a different plurality of nominal operating voltages. For example, an embodiment will be described below which is configured to operate with an applied nominal operating voltage which can be any one of three possible nominal operating voltages: 120 VAC, 230 VAC and 277 VAC. In general, in various embodiments the number of nominal operating voltages for which the emergency lighting system is configured to operate may be two, three or more than three, and the nominal operating voltages may be any convenient nominal operating voltages, such as those listed above.

In operation, AC rectifier 110 and charger converter 120 operate to take energy received via input voltage 5 from a charging power source (e.g., AC Mains) and convert the energy to a desired voltage and current for charging battery 130. AC rectifier 110 and charger converter 120 can be implemented with a variety of known circuits and further details of their construction and operation will be omitted.

Meanwhile, as described above, charging battery 130 when its ambient temperature is too low (e.g., negative ° C.) may expose the battery compartment to the threat of damage or even explosion, for example due to a potential build-up of hydrogen gases which is known to occur with the typically used NiCd rechargeable batteries if such charging is attempted while the battery 130 is frozen. Accordingly, the low-end ambient temperature at which emergency lighting system 100 can operate in outdoors lighting systems could be limited to an undesirably high temperature (e.g., 0° C.) if other provisions are not taken. This might prevent emergency lighting system 100 from being deployed in a variety of locations (e.g., unheated garages, outside staircases, etc.) where it would otherwise be desired to install emergency lighting system 100.

Accordingly, emergency lighting system 100 includes heater 180 which is configured to heat battery 130 above the ambient temperature during the charging phase, and thereby extend the low-end ambient temperature at which emergency lighting system 100 may operate, for example to −20° C. or lower, without exposing the battery cells and/or compartment to the threat of explosion or other damage. Although not shown in the functional block diagram of FIG. 1 for purposes of improving the clarity of the illustration, in general heater 180 is located in close proximity or immediately adjacent to battery 130 so as to heat battery 130 when heater 180 is activated.

In the embodiment illustrated in FIG. 1, heater 180 includes a first heating element 182, a second heating element 184 and a thermal protector 186. In various other embodiments, the number of heating elements may be more than two. In some embodiments, the number of heating elements may depend on the number of nominal operating voltages with which emergency lighting system 100 is designed to operate. As will be described below in more detail with respect to FIGS. 3 and 5, heater 180 has a plurality of voltage inputs, and an output terminal, wherein at least a first one of the heating elements (e.g., first heating element 182) is connected between a first voltage input and a second voltage input, and at least a second one of the heating elements (e.g., second heating element 184) is connected between the second voltage input and the output terminal. Furthermore, the output terminal of heater 180 is connected to second input terminal 12 (neutral) of emergency lighting system 100. As will be explained in greater detail below, switching circuit 170 is configured to selectively connect the first input terminal 10 of emergency lighting device 100 to one of the plurality of voltage inputs of heater 180 so as to form a closed circuit path for current to flow from the charging power source through a selected group of one or more heating elements of heater 180 and thereby dissipate thermal energy to heat battery 130.

Here, it is understood that each of first and second heating elements 182 and 184 may comprise resistive heating elements. Furthermore, as described in greater detail below with respect to FIG. 4, first heating element 182 and second heating element 184 may each comprise a plurality of resistors. As far as their physical position is concerned, the resistors should be located as evenly spaced as possible near battery 130, so that the heat dissipated by the resistors provides an even warming of battery 130.

Heater 180 also includes a thermal protector 186 which is configured to deactivate heater in the case that heater 180 becomes too hot (e.g., due to a defective electronic control of the switching circuit 170). In some embodiments, thermal protector 186 is placed near or adjacent to one or more of first heating element 182 and second heating element 184 and automatically "opens" in the event that the temperature in the vicinity of thermal protector 186 exceeds a specified temperature threshold (e.g., 70° C.) to guarantee that the resistors in heater 180 do not exceed a temperature (e.g., 100° C.) where they could start to pose a fire danger for a circuit board on which they are mounted or the surrounding insulating materials. As long as the temperature in the vicinity of thermal protector 186 is less than the threshold temperature, then thermal protector 186 presents a low impedance to current flowing therethrough. It is conceived that in some embodiments thermal protector 186 may be omitted and replaced by other arrangements for preventing overheating of heater 180.

As will be explained in detail below, AC voltage level detector 140, temperature level/threshold detector 150, logic circuit 160, and switching circuit 170 operate together to automatically adapt heater 180 to operate with any one of a plurality of nominal operating voltages applied to first and second input terminals 10 and 12. For example, in the particular example illustrated in FIG. 1, AC voltage level detector 140, temperature level/threshold detector 150, logic circuit 160, and switching circuit 170 operate together to automatically adapt heater 180 to operate with either 120 VAC or 277 VAC without the need for any human intervention in the form of a voltage switch, or separate terminals to which the charging power source must be connected for different nominal input voltages, etc. That is, regardless of whether the applied nominal operating voltage is 120 VAC or 277 VAC, the installation is the same—the AC mains lines are always connected to first and second input terminals 10 and 12, and the AC voltage level detector 140, temperature level/threshold detector 150, logic circuit 160, and switching circuit 170 determine when and how to activate heater 180 to operate regardless of the applied nominal operating voltage.

Again, although FIG. 1 illustrates a particular example for 120 VAC and 277 VAC, it should be understood that in other embodiments, AC voltage level detector 140, temperature level/threshold detector 150, logic circuit 160, and switching circuit 170 may adapt heater 180 to be operated by additional and/or different nominal operating voltages.

In operation, AC voltage level detector 140 produces and outputs an input voltage level signal 145 which indicates the applied nominal operating voltage of the charging power source to which input terminals 10 and 12 are connected. More specifically, AC voltage level detector 140 responds to the actual input voltage 5 applied across first and second input terminals 10 and 12, and based upon input voltage 5, AC voltage level detector 140 determines the corresponding applied nominal operating voltage of the charging power source to which input terminals 10 and 12 are connected among a plurality of nominal operating voltages with which emergency lighting source 100 is configured to operate. Furthermore, AC voltage level detector 140 produces and outputs input voltage level signal 145 in dependence on the applied nominal operating voltage which is determined in response to the actual input voltage 5 applied across first and second input terminals 10 and 12.

For example, when the actual input voltage 5 is 116 VAC, AC voltage level detector 140 may determine that the corresponding applied nominal operating voltage is 120 VAC and may produce and output input voltage level signal 145 which indicates that the applied nominal operating voltage is 120 VAC. On the other hand, when the actual input voltage 5 is 282 VAC, AC voltage level detector 140 may determine that the corresponding applied nominal operating voltage is 277 VAC and may produce and output input voltage level signal 145 which indicates that the applied nominal operating voltage is 277 VAC.

In some embodiments, input voltage level signal 145 is a digital signal whose digital value indicates the applied nominal operating voltage. For example, in the embodiment illustrated in FIG. 1 where there are only two possible nominal operating voltages for which emergency lighting system 100 is configured to operate, then input voltage level signal 145 may be a one bit (binary) digital signal. For example, input voltage level signal 145 may have a high voltage level or otherwise indicate a logic value of "1" when AC voltage level detector 140 determines that the applied nominal operating voltage is 277 VAC, and may have a logic value of "0" when AC voltage level detector 140 determines that the applied nominal operating voltage is 120 VAC. In other embodiments where the emergency lighting system is configured to operate with more than two possible nominal operating voltages, then input voltage level signal 145 may not be a binary signal (e.g., ternary), or may be a binary signal represented by two or more bits. For example, in an embodiment where the emergency lighting system is configured to operate with nominal operating voltages of 120 VAC, 230 VAC or 277 VAC, then input voltage level signal 145 may be a ternary signal, or a binary signal represented by two bits.

In the embodiment illustrated in FIG. 1, AC voltage level detector 140 receives at its input a detection voltage with is an output voltage of AC rectifier 110 (which in turn depends on input voltage 5), and AC voltage level detector 140 determines the applied nominal operating voltage from the output voltage of AC rectifier 110. However as will be described below with respect to FIGS. 5 and 6, in other embodiments AC voltage level detector 140 receives at its input other detection voltages (positive or negative) which are produced in response to input voltage 5 and whose magnitude varies as the magnitude of input voltage 5 varies.

In some embodiments, AC voltage level detector 140 may include one or more threshold detectors or comparators for determining the applied nominal operating voltage among a predefined set of possible nominal operating voltages for emergency lighting system 100. For example, in a simple embodiment, AC voltage level detector 140 may include a single threshold detector with a threshold set at a voltage level which is midway between the detection voltage which would be received for a nominal input voltage of 120 VAC, and the detection voltage which would be received for a nominal input voltage of 277 VAC, and may produce input voltage level signal 145 whose value depends on whether or not the detection voltage is greater than or less than the threshold. In a more complicated embodiment, AC voltage level detector 140 may include one or more threshold detectors or comparators each corresponding to a different one of the possible nominal operating voltages for emergency lighting system 100 and may produce input voltage level signal 145 whose value depends on some logical combination of the outputs of those comparators. A variety of different embodiments of AC voltage level detector 140 are possible, as would be appreciated by those skilled in the art.

Temperature level/threshold detector 150 determines whether a temperature in the vicinity of battery 130 exceeds a predetermined battery temperature threshold and in response thereto produces a temperature signal 155 indicating whether the temperature exceeds a backup power supply temperature threshold (e.g., a battery-vicinity temperature threshold). As will be explained in more detail below, temperature signal 155 may be employed to determine when/whether to activate heater 180 for heating battery 130. In particular, when the temperature of battery 130 (or in the vicinity of battery 130) is less than a threshold temperature, then heater 180 is enabled to heat battery 130 during a charging cycle to ensure that battery 130 is at an appropriate temperature for charging. On the other hand, when the temperature of battery 130 (or in the vicinity of battery 130) is greater than the threshold temperature, then heater 180 is disabled.

Beneficially, temperature level/threshold detector 150 operates with hysteresis so that temperature signal 155 does not toggle or oscillate back and forth as the temperature in the vicinity of battery 130 increases and decreases (around a single threshold) in response to enabling and disabling heater 180. More specifically, the battery temperature threshold which is employed by temperature level/threshold detector 150 may have a hysteresis value associated with it such that the battery temperature threshold for toggling temperature signal 155 when the temperature of battery 130 increases after heater 180 has been activated is different than the battery temperature threshold for toggling temperature signal 155 when the temperature of battery 130 decreases after heater 180 has been deactivated. For example, the battery temperature threshold may have a first value, say 10° C., for toggling temperature signal 155 to activate heater 180 when heater 180 has been deactivated, and may have a second value, say 15° C., for toggling temperature signal 155 to deactivate heater 180 when heater 180 has been activated. Accordingly, small variations in the sensed temperature of battery 130 will not cause oscillation of temperature signal 155 and thereby prevent heater 180 from being cycled on and off too frequently.

In some embodiments, temperature signal 155 is a binary digital signal whose digital value indicates whether or not the temperature of battery 130 or in the vicinity of battery 130 exceeds the backup power supply temperature threshold. For example, temperature signal 155 may have a high voltage level or otherwise indicate a logic value of "1" when temperature level/threshold detector 150 determines that temperature of battery 130 or in the vicinity of battery 130 does not exceed the backup power supply temperature threshold (indicating therefore that heater 180 should be activated), and may have a logic value of "0" when temperature level/threshold detector 150 determines that temperature of battery 130 or in the vicinity of battery 130 does exceed the backup power supply temperature threshold (indicating therefore that heater 180 should be deactivated). Again, as explained above, it is understood that the battery temperature threshold may be varied to provide hysteresis.

In some embodiments, temperature level/threshold detector 150 includes a processor (e.g., a microcontroller unit—MCU) and a temperature sensor located very close or adjacent to battery 130 and which is able to sense the temperature in the vicinity of battery 130 which may be the same as or very close to the actual temperature of battery 130. In other embodiments, the MCU may have an internal temperature sensor itself. The MCU then compares the sensed temperature to a battery temperature threshold value (for example stored in memory associated with the MCU) and generates temperature signal 155 as a result of that comparison. Again, as explained above, MCU may associate a hysteresis value with the battery temperature threshold value so as to prevent undesired toggling or oscillation of temperature signal 155.

In other embodiments, the switching element (e.g., part of the switching circuit 170) corresponding to the temperature level/threshold detector 150, may be a simple commercially available thermostat such as an AIRPAX™ series 6700 thermostat (e.g., AIRPAK™ 67L040). However, a possible disadvantage to the use of such a thermostat may be that the thermostat may experience a very high switching frequency, and the specified lifetime cycle specification of such devices (e.g., tens of thousands of cycles) may undesirably limit the lifetime of emergency lighting system 100, which might otherwise have a lifetime of 5 years, 7 years, or even longer. The embodiment described above which employs a temperature sensor and an MCU comparison may overcome this disadvantage.

Logic circuit 160 has a first input 162 configured to receive input voltage level signal 145 from AC voltage level detector 140, and a second input 164 configured to receive temperature signal 155 from temperature level/threshold detector 150 and in response thereto produces an output signal 165 to switching circuit 170 for controlling the operation of heater 180. To illustrate the principles involved, in an example embodiment: when temperature signal 155 has a logic value of "1" indicating that the temperature in the vicinity of battery 130 does not exceed the battery temperature threshold (and therefore heater 180 should be activated) and input voltage level signal 145 has a logic value of "1" indicating that the applied nominal operating voltage is 277 VAC, then logic circuit 160 may output control signal 165 having a first value; when temperature signal 155 has a logic value of "1" indicating that the temperature in the vicinity of battery 130 does not exceed the battery temperature threshold (and therefore heater 180 should be activated) and input voltage level signal 145 has a logic value of "0" indicating that the applied nominal operating voltage is 120 VAC, then logic circuit 160 may output control signal 165 having a second value; and when temperature signal 155 has a logic value of "0" indicating that the temperature in the vicinity of battery 130 exceeds the battery temperature threshold (and therefore heater 180 should be deactivated), then logic circuit 160 may output control signal 165 having a third value (regardless of the state of input voltage level signal 145). It should be understood that the mapping of logic values "1" and "0" in the example above are arbitrary, and the values could be reversed in other embodiments.

Figure 2:
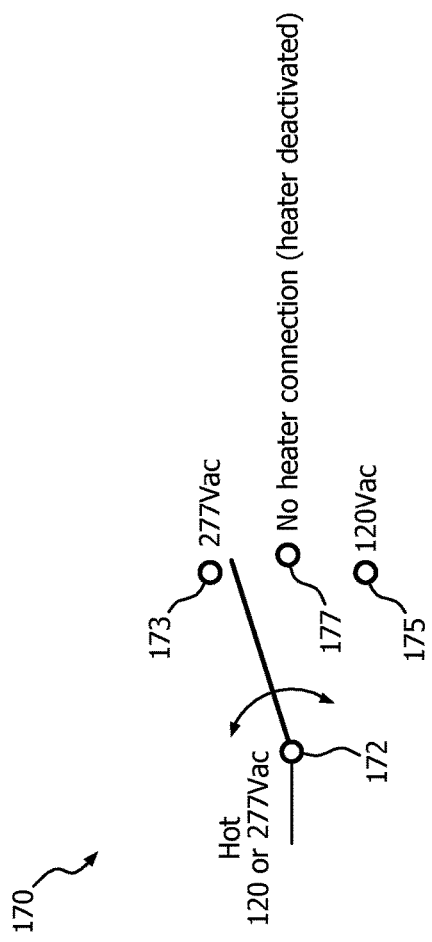
FIG. 2 illustrates an example embodiment of a switching circuit for a portion of an emergency lighting system.

FIG. 2 illustrates an example embodiment of a switching circuit 170 for a portion of an emergency lighting system.

Switching circuit 170 has a first input 172 connected to first input terminal 10 for receiving the input voltage 5, and has a second input 174 for receiving control signal 165 from logic circuit 160. In response to the control signal 165, switching circuit 170 is placed into one of three states of positions: a first position or state 173 where first input terminal 10 is connected to an output terminal 277 VAC; a second position or state 175 where first input terminal 10 is connected to an output terminal 120 VAC; and a third position or state 177 where first input terminal 10 is not connected to any output terminal. In some embodiments, switching circuit 170 may be realized with one or more electromechanical relays which may enhance the lifetime of emergency lighting system 100. In other embodiments, switching circuit 170 may be realized with one or more electronic switches, such as field effect transistors (FETs), diodes, etc.

As shown in FIG. 1, each of the output terminals 277 VAC and 120 VAC of switching circuit 170 is connected to a corresponding input terminal of heater 180.

TABLE 1 below shows an example embodiment of a logical truth table which may be implemented by the combination of logic circuit 160 and switching circuit 170 in FIG. 1.

TABLE 1

| Binary Input to Logic Combine | | "CONTROL" action (digital ternary input) | Make Contact Between Input Terminal 10 and: |
|---|---|---|---|
| 145 | 155 | | |
| 1 | 1 | HEAT w/ 277 Vac mains present | 277 Vac |
| 0 | 1 | HEAT w/ 120 Vac mains present | 120 Vac |
| X | 0 | NO HEATING | (HB) OFF |

It should be understood that the mapping of logic values "1" and "0" in TABLE 1 are arbitrary, and the values could be reversed in other embodiments.

The operation of AC voltage level detector 140, temperature level/threshold detector 150, logic circuit 160, and switching circuit 170 (which operate together to automatically adapt heater 180 to operation with any one of a plurality of nominal operating voltages applied to first and second input terminals 10 and 12) may now be understood from TABLE 1 above.

In particular, temperature level/threshold detector 150 is configured to determine whether the temperature in the vicinity of the battery 130 exceeds the backup power supply temperature threshold and to produce temperature signal 155 indicating whether the temperature exceeds the backup power supply temperature threshold. Temperature signal 155 in turn determines whether 180 heater is activated or deactivated. AC voltage level detector 140 is configured to determine the applied nominal operating voltage from input voltage 5 and to produce input voltage level signal 145 indicating what the applied nominal operating voltage is. When heater 180 is activated in response to temperature signal 155, input voltage level signal 145 determines which one or more of first and second heating elements 182 and 184 are activated. In this particular embodiment, when the applied nominal operating voltage is 277 VAC, then input voltage level signal 145 is high (logical "1") and switching circuit 120 connects first input terminal 10 to heater 180 so as to cause a closed circuit between first and second input terminals 10 and 12 to include both first and second heating elements 182 and 184 (and thermal protector 186) such that the AC current flows through first and second heating elements 182 and 184, and first and second heating elements 182 and 184 both generate heat for heating battery 130 (first and second heating elements 182 and 184 are both activated). On the other hand, when the applied nominal operating voltage is 120 VAC, then input voltage level signal 145 is low (logical "0") and switching circuit 120 connects first input terminal 10 to heater 180 so as to bypass first heating element 182 and to cause a closed circuit between first and second input terminals 10 and 12 to exclude first heating element 182 and include only second heating element 184 (and, generally, thermal protector 186) such that only second heating element 184 is activated to generate heat for heating battery 130 (first heating element 182 is deactivated).

In practice, logic circuit 160 represents a general purpose implementation of emergency lighting system 100, and in some implementations the logic circuit 160 may be omitted and the functionality of logic circuit 160 may be "built in" to the configuration of switching circuit 170.

Figure 3:
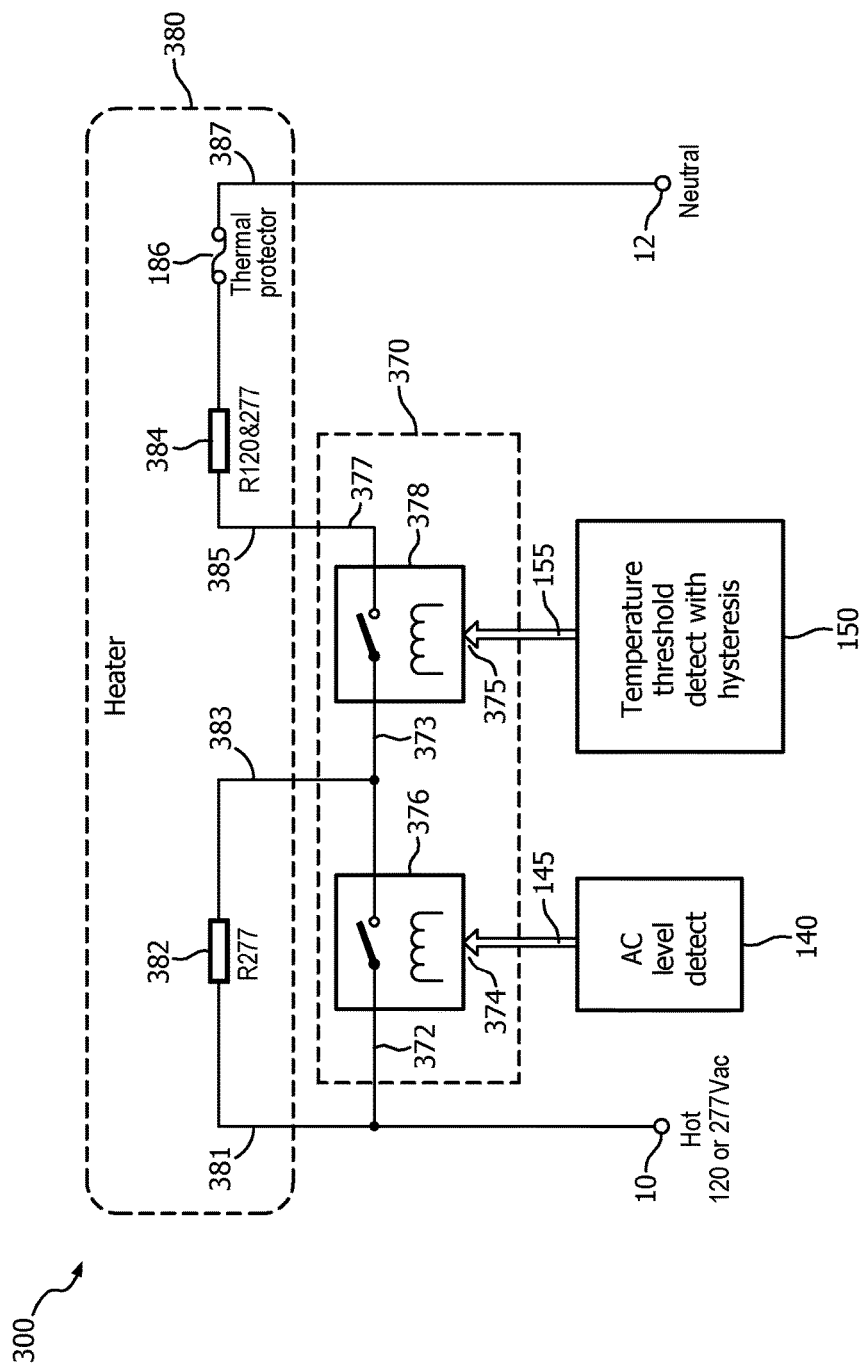
FIG. 3 illustrates an example embodiment of an arrangement of a voltage level detector, a temperature detector, a switching circuit, and a heater for an emergency lighting system whose input AC voltage is either 120 VAC or 277 VAC.

For example, FIG. 3 illustrates an example embodiment of an arrangement 300 of AC voltage level detector 140, temperature level/threshold detector 150, a switching circuit 370 and a heater 380 for an emergency lighting system, such as emergency lighting system 100. Here it is seen that no specific logic circuit is included, but rather the functionality of the logic circuit is provided by the arrangement of switching circuit 370 and heater 380.

The construction and operation of AC voltage level detector 140 and temperature level/threshold detector 150 may be the same as explained above with respect to FIG. 1, and so a description thereof will not be repeated.

Switching circuit 370 includes a first switch 376 and a second switch 378. First and second switches 376 and 378 each may be realized with an electromechanical relay. In other embodiments, first and second switches 376 and 378 may be realized with one or more electronic switches, such as field effect transistors (FETs), diodes, etc.

First switch 376 receives input voltage 5 from first input terminal 10 at a first input 372 and receives input voltage level signal 145 as a control signal at first control input 374. Second switch 378 is connected between terminals 373 and 377 and receives temperature signal 155 as a control signal at second control input 375.

Heater 380 may be one embodiment of heater 180 described above with respect to FIG. 1. Heater 380 includes a first heating element 382, a second heating element 384 and thermal protector 186. Heater 380 has a plurality of voltage inputs 381, 383 and 385, and an output terminal 387. First heating element 382 is connected in series between voltage inputs 381 and 383, and second heating element 384 is connected in series between voltage input 385 and output terminal 387, together with thermal protector 186. Furthermore, output terminal 387 of heater 180 is connected to second input terminal 12 (neutral) of emergency lighting system 100. Again it is understood that each of first and second heating elements 382 and 384 may comprise resistive heating elements. Furthermore, as described in greater detail below with respect to FIG. 4, first heating element 382 and second heating element 384 may each comprise a plurality of resistors.

The operation of arrangement 300 is similar to that explained above with respect to FIG. 1. In particular, temperature level/threshold detector 150 is configured to determine whether the temperature in the vicinity of the battery 130 exceeds the backup power supply temperature threshold and to produce temperature signal 155 indicating whether the temperature exceeds the backup power supply temperature threshold. Temperature signal 155 in turn determines whether heater 380 is activated or deactivated. AC voltage level detector 140 is configured to determine the applied nominal operating voltage from input voltage 5 and to produce input voltage level signal 145 indicating what the applied nominal operating voltage is.

Here, second switch 378 is controlled by temperature signal 155 to be opened when the temperature in the vicinity of the battery 130 exceeds the backup power supply temperature threshold. In that case, a current path for heater 380 does not exist, and no current will flow through heater 380 regardless of the state of input voltage level signal 145, and thus heater 380 is deactivated. On the other hand, second switch 378 is controlled by temperature signal 155 to be closed when the temperature in the vicinity of the battery 130 does not exceed the backup power supply temperature threshold. In that case, a current path for heater 380 is provided through second switch 378, current will flow through one (384) or both (382 and 384) heating elements of heater 380, and thus heater 380 is activated.

In the case where heater 380 is activated in response to the temperature in the vicinity of the battery 130 not exceeding the backup power supply temperature threshold, input voltage level signal 145 determines which one or more of the first and/or second heating elements 382 and 384 are activated. In this particular embodiment, when the applied nominal operating voltage is 277 VAC, then first switch 376 is open and a closed circuit is provided between first and second input terminals 10 and 12 to include both first and second heating elements 382 and 384 (and thermal protector 186) such that current flows through first and second heating elements 382 and 384 and first and second heating elements 382 and 384 both generate heat for heating battery 130 (first and second heating elements 382 and 384 are both activated). On the other hand, when the applied nominal operating voltage is 120 VAC, then first switch 376 is closed so as to bypass first heating element 382 and to cause a closed circuit between first and second input terminals 10 and 12 to exclude first heating element 382 and to include only second heating element 384 (and, generally, thermal protector 186) such that only second heating element 384 is activated to generate heat for heating battery 130 (first heating element 382 is deactivated).

An advantage of emergency lighting system 100 and arrangement 300 to automatically selectively activate different groups of one of more heating elements in response to different applied nominal operating voltages becomes apparent when one considers a different emergency lighting system and heater, where the same heating elements are always activated regardless of the input voltage. For example, in such a case the ratio ($R_N$) of the power $P_A$ dissipated by the heater when the input voltage is 277 VAC to the power $P_B$ dissipated by the heater when the input voltage is 120 VAC is:

$$R_N = (277)^2/(120)^2 = 5.33 \quad (1)$$

Furthermore, if we consider that the actual input voltage might be as low as 102 VAC for a nominal operating voltage of 120 VAC, and that actual input voltage might be as high as 305 VAC for a nominal operating voltage of 277 VAC, if we calculate $R_M$ as the ratio of the power dissipations for 305 VAC and 102 VAC, then we see that:

$$R_M = (305)^2/(102)^2 = 8.94 \quad (2)$$

Such an uncontrolled power dissipation range might make it difficult to design the heater to apply a desired minimum heating energy to the battery at the lowest input voltage, while still avoiding overheating at the highest input voltage.

Beneficially, in some embodiments the resistance values of first and second heating elements 382 and 384 may be selected so as to equalize or approximately equalize the power dissipation of heater 380 for a plurality of different nominal operating voltages with which emergency lighting system 100 is configured to operate.

Figure 4:
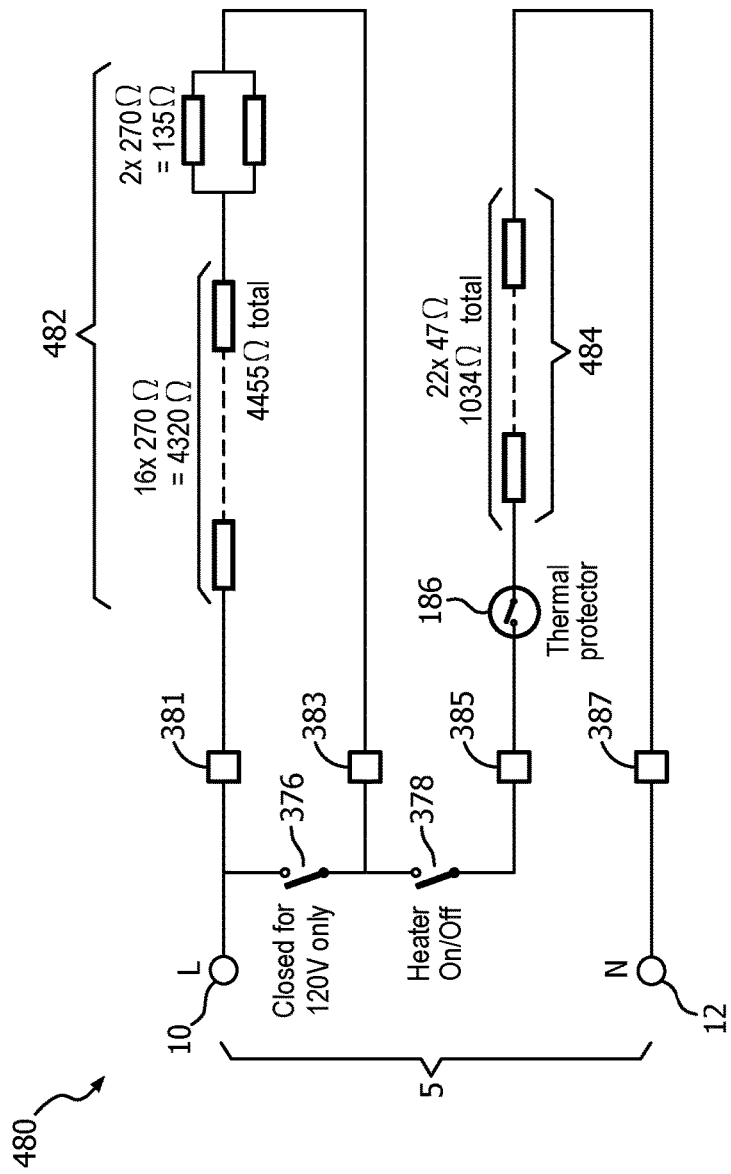
FIG. 4 illustrates an example embodiment of a heater for an emergency lighting system whose input AC voltage is either 120 VAC or 277 VAC.

FIG. 4 illustrates an example embodiment of a heater 480 for an emergency lighting system which may be employed in emergency lighting system 100 and/or arrangement 300 to equalize or approximately equalize the power dissipation for two different nominal operating voltages (e.g., 277 VAC and 120 VAC).

Heater 480 includes a first heating element 482 and a second heating element 484.

First heating element 482 comprises a plurality of resistors, in particular sixteen (16) 270Ω resistors arranged in series with a parallel combination of two 270Ω resistors, yielding a total resistance of 4455Ω. Second heating element 484 also comprises a plurality of resistors, in particular twenty two (22) 47Ω resistors arranged in series, yielding a total resistance of 1034Ω.

Here it can be seen that the power, P1, dissipated by heater 480 when the applied nominal operating voltage is 277 VAC and input voltage 5 is connected across the series combination of first heating element 482 and second heating element 484 will be:

$$P1 = (277)^2/(4455+1034) = 13.98W \quad (3)$$

Meanwhile, the power, P2, dissipated by heater 480 when the applied nominal operating voltage is 120 VAC and input voltage 5 is connected across only the second heating element 484 will be:

$$P2 = (120)^2/(1034) = 13.93W \quad (4)$$

So it is seen that the power P2 is approximately equal to the power P1, and the power dissipation of heater 480 has been equalized for the two different values of applied nominal operating voltage, 120 VAC and 277 VAC. By appropriate selection of resistance values, in other embodiments the power dissipation of a heater may be been equalized for more than two different values of applied nominal operating voltage without limitation, for example 120 VAC, 230 VAC and 277 VAC.

Figure 5:
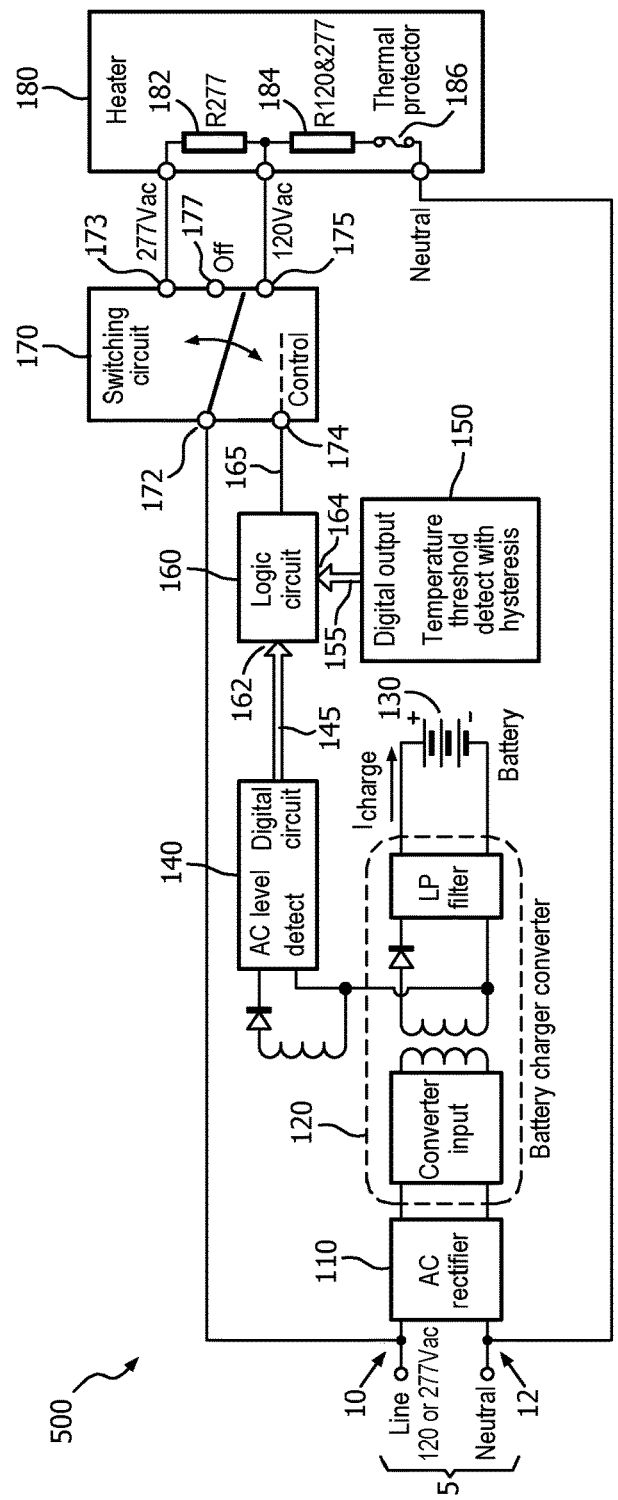
FIG. 5 illustrates a functional block diagram of a second embodiment of a portion of an emergency lighting system.

FIG. 5 illustrates a functional block diagram of a second embodiment of a portion of an emergency lighting system 500. The construction and operation of emergency lighting system 500 is the same as for emergency lighting system 100, except that in emergency lighting system 500, voltage detector 140 receives it detection voltage across an inductor (illustrated as a $2^{nd}$ secondary winding) connected at the output of a transformer of charger converter 120, instead of at the output of AC rectifier 110. Accordingly, a description of the construction and operation of emergency lighting system 500 will not be repeated.

Figure 6:
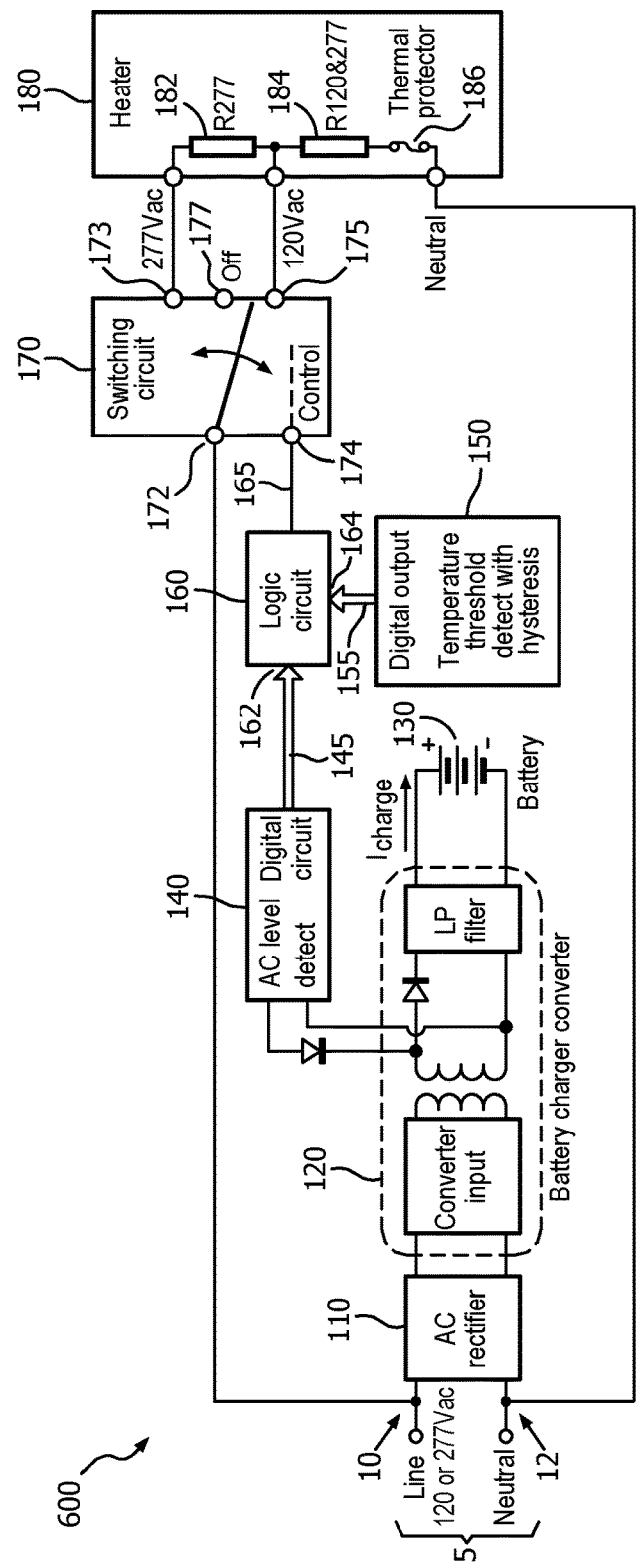
FIG. 6 illustrates a functional block diagram of a third embodiment of a portion of an emergency lighting system.

FIG. 6 illustrates a functional block diagram of a third embodiment of a portion of an emergency lighting system 600. The construction and operation of emergency lighting system 600 is the same as for emergency lighting system 100, except that in emergency lighting system 600, AC voltage level detector 140 receives its detection voltage across the output (secondary winding) of a transformer of charger converter 120 (instead of at the output of AC rectifier 110), and the negative pulses in the secondary of the battery charger converter 120 are this time rectified as an input to the AC voltage level detector 140. Accordingly, a description of the construction and operation of emergency lighting system 600 will not be repeated.

Figure 7:
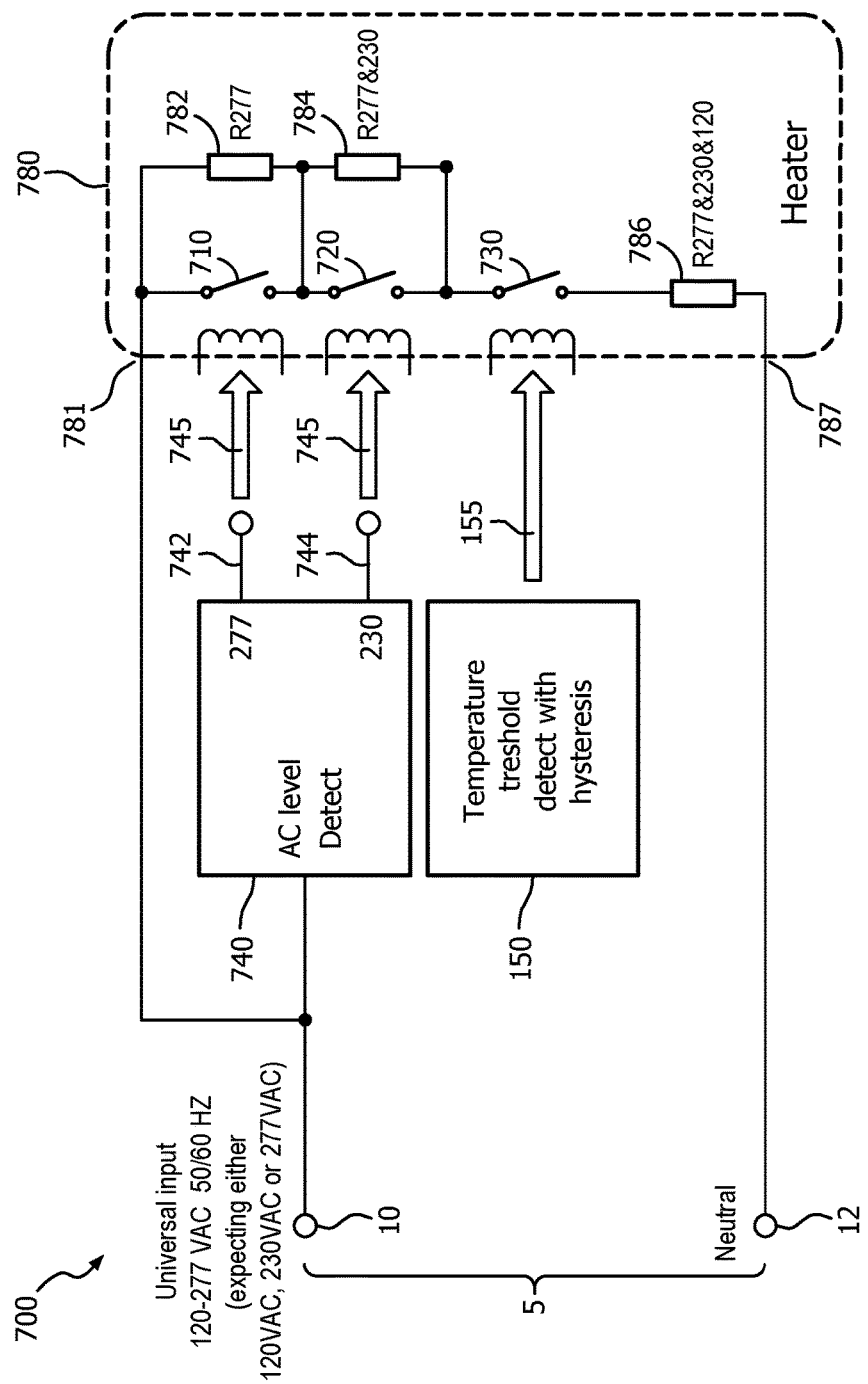
FIG. 7 illustrates another example embodiment of an arrangement of a voltage level detector, a temperature detector, a switching circuit, and a heater for an emergency lighting system whose input AC voltage is one of either 120 VAC, 230 VAC, or 277 VAC.

FIG. 7 illustrates another example embodiment of an arrangement 700 of an AC voltage level detector 740, temperature level/threshold detector 150, and heater 780 for an emergency lighting system, such as emergency lighting system 100, 500 or 600. Here, again, it is seen that no specific logic circuit is included, but rather the functionality of the logic circuit is provided as part of the heater 780, which here integrates the switching circuit onto the same circuit board.

The construction and operation of temperature level/threshold detector 150 may be the same as explained above with respect to FIG. 1, and so a description thereof will not be repeated. In particular, temperature level/threshold detector 150 is configured to determine whether the temperature in the vicinity of the battery 130 exceeds the backup power supply temperature threshold and to produce temperature signal 155 indicating whether the temperature exceeds the backup power supply temperature threshold. Temperature signal 155 in turn determines whether heater 780 is activated or deactivated.

Voltage detector 740 may be similar in construction and operation to voltage detector 140, with the following differences. Voltage level detector 740 is configured to produce and output via output terminals 742 and 744 a two-bit input voltage level signal 745 which indicates which one of at least three possible nominal operating voltages corresponds to the applied nominal operating voltage as detected in response to input voltage 5. In particular, input voltage level signal 745 indicates whether the applied nominal operating voltage is 120 VAC, 230 VAC or 277 VAC. An example embodiment of a truth table which may be implemented by arrangement 700 including voltage level detector 740 will be described below with respect to TABLE 2.

Heater 780 includes a first heating element 782, a second heating element 784 and a third heating element 786. Heater 780 may also include a thermal protector (not shown in FIG. 7, but generally placed in series with the third heating element 786). Heater 780 has a plurality of voltage inputs, including a voltage input 781, and an output terminal 787. Voltage input 781 of heater 780 is connected to first input terminal 10, and output terminal 787 of heater 780 is connected to second input terminal 12 (neutral) of emergency lighting system 700. As before, it is understood that each of first, second, and third heating elements 782, 784, and 786 may comprise resistive heating elements. Furthermore, as described above with respect to FIG. 4, first, second, and third heating elements 782, 784, and 786 may each comprise a plurality of resistors.

Arrangement 700 also includes a first switch 710, a second switch 720, and a third switch 730. First, second, and third switches 710, 720, and 730 each may be realized with an electromechanical relay. In other embodiments, first second, and third switches 710, 720, and 730 may be realized with one or more electronic switches, such as field effect transistors (FETs), diodes, etc.

First switch 710 is connected across first heating element 782, receiving input voltage 5 from first input terminal 10 at a first input 781 and receiving a first bit (742) of input voltage level signal 745 as a control signal. Second switch 720 is connected across second heating element 784 and receives a second bit (744) of input voltage level signal 745 as a control signal. Third switch 730 is connected between: (1) the terminal of the second heating element 784 that is not common with the first heating element 782; and (2) third heating element 786, and receives temperature signal 155 as a control signal.

The operation of arrangement 700 is explained now with respect to an example embodiment of a logical truth table which may be implemented by arrangement 700.

TABLE 2

| Mains voltage | Binary Relay Controls (Contacts: 0 = open, 1 = closed) | | | Effect |
| --- | --- | --- | --- | --- |
| | 277 | 230 | TTD | |
| 277 Vac | 0 | 0 | 1 | HEAT w/ 277 Vac mains present |
| 230 Vac | 1 | 0 | 1 | HEAT w/ 230 Vac mains present |
| 120 Vac | 1 | 1 | 1 | HEAT w/ 120 Vac mains present |
| X$_{(don't\ care)}$ | 0 | 1 | 1 | DISALLOWED |
| | X | X | 0 | NO HEATING |

It should be understood that the mapping of logic values "1" and "0" in TABLE 2 are arbitrary, and the values could be reversed in other embodiments.

From inspection of FIG. 7 and TABLE 2, the operation of AC voltage level detector 740, temperature level/threshold detector 150 and switches 710, 720, and 730 to automatically adapt heater 780 to operation with any one of a plurality of nominal operating voltages applied to first and second input terminals 10 and 12 may now be understood.

In particular, temperature level/threshold detector 150 is configured to determine whether the temperature in the vicinity of the battery 130 exceeds the backup power supply temperature threshold and to produce temperature signal 155 indicating whether the temperature exceeds the backup power supply temperature threshold. Temperature signal 155 in turn determines whether heater 780 is activated or deactivated. Voltage level detector 740 is configured to determine the applied nominal operating voltage from input voltage 5 and to produce input voltage level signal 745 indicating what the applied nominal operating voltage is.

When heater 780 is activated in response to temperature signal 155 by closing third switch 730, then input voltage level signal 745 determines which one or more of the first, second, and third heating elements 782, 784, and 786 are activated.

In this particular embodiment, when the applied nominal operating voltage is 277 VAC, then input voltage level signal 745 has a logical value of "00" and first and second switches 710 and 720 are opened so as to cause a closed circuit between first and second input terminals 10 and 12 to include all of first, second and third heating elements 782, 784, and 786 such that current flows through first, second and third heating elements 782, 784, and 786, and first, second and third heating elements 782, 784, and 786 all generate heat for heating battery 130 (first, second and third heating elements 782, 784, and 786 are all activated). On the other hand, when the applied nominal operating voltage is 230 VAC, then input voltage level signal 745 has a logical value of "10." In this case, first switch 710 is closed so as to bypass first heating element 782, and second switch 720 is opened so as to cause a closed circuit between first and second input terminals 10 and 12 to exclude first heating element 782 and to include second and third heating elements 784 and 786 such that current flows through second and third heating elements 784 and 786, and second and third heating elements 784 and 786 both generate heat for heating battery 130 (second and third heating elements 784 and 786 are activated, and first heating element 782 is deactivated). Furthermore, when the applied nominal operating voltage is 120 VAC, then input voltage level signal 745 has a logical value of "11." In this case, first and second switches 710 and 720 are closed so as to bypass first heating element 782 and second heating element 784, so as to cause a closed circuit between first and second input terminals 10 and 12 to exclude first and second heating elements 782 and 784 and to include third heating element 786 such that current flows through third heating element 786, and third heating element 786 generates heat for heating battery 130 (third heating element 786 is activated, and first and second heating elements 782 and 784 are deactivated).

By appropriate selection of resistance values for first, second, and third heating elements 782, 784, and 786, the heating power dissipated by heater 780 in response to all three nominal operating voltages 277 VAC, 230 VAC, and 120 VAC may be made to be equal, or approximately equal, to each other.

Figure 8:
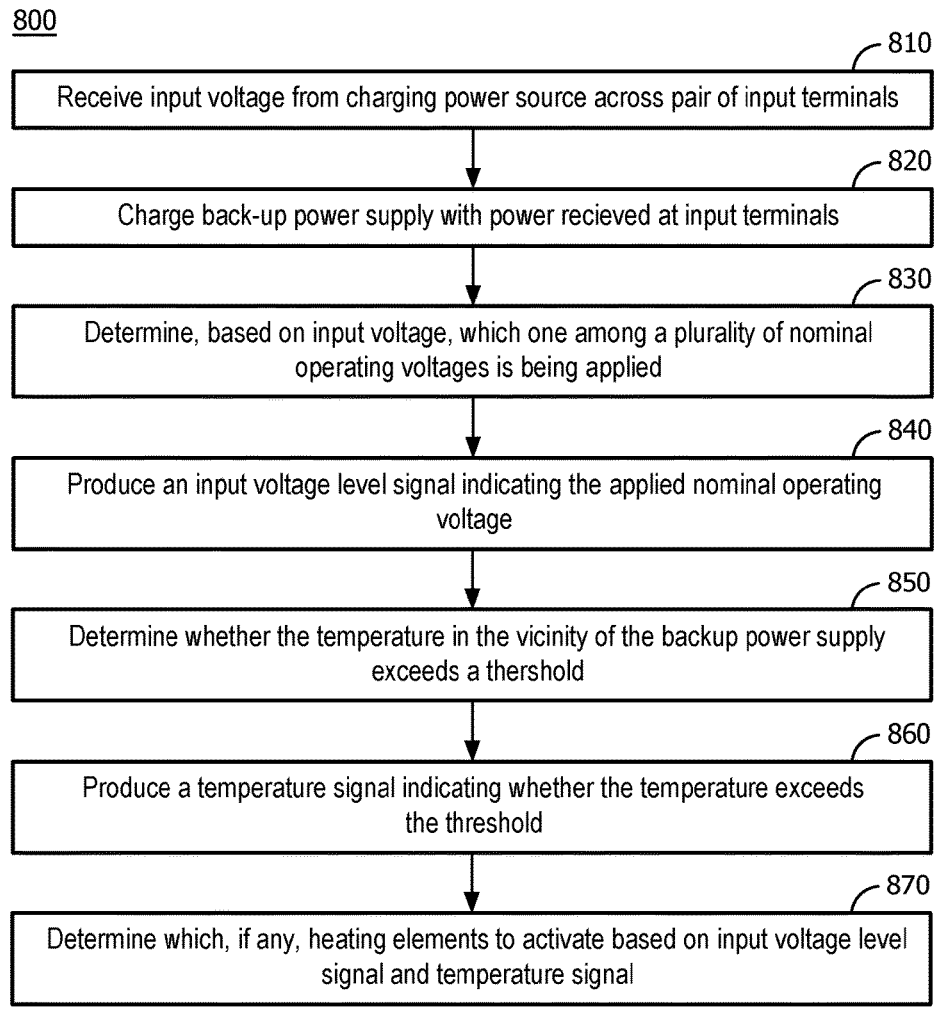
FIG. 8 illustrates an example embodiment of a method of charging a backup power supply for an emergency lighting system.

FIG. 8 illustrates an example embodiment of a method 800 of charging a backup power supply for an emergency lighting system, such as emergency lighting systems 100, 500, and 600 described above.

In an operation 810, an emergency lighting system receives an input voltage across a pair of input terminals from a charging power source. The input voltage corresponds to one of a plurality of nominal operating voltages for the emergency lighting system.

In an operation 820, a backup power supply (e.g., a battery) is charged using power received from the charging power source at the input terminals. In some embodiments, charging may only be performed periodically, during defined charging cycles which may be based on the energy retention capacity of the backup power source as a function of time.

In an operation 830, it is determined, based on the received input voltage, which one of the plurality of nominal operating voltages for the emergency lighting system is being applied across the pair of input terminals by the charging power source.

In an operation 840, an input voltage signal is generated which indicates which one of the plurality of nominal operating voltages is the applied nominal operating voltage.

In an operation 850, it is determined whether the temperature in the vicinity of the backup power supply exceeds a backup power supply temperature threshold.

In an operation 860, a temperature signal is produced which indicates whether the temperature in the vicinity of the backup power supply exceeds (or not) the backup power supply temperature threshold.

In some embodiments, operation 850 determines whether the temperature of a battery exceeds a battery temperature threshold. When the temperature exceeds the battery temperature threshold, this indicates that the battery does not need to be heated during a charging cycle, and the heater may be disabled. On the other hand, when the temperature does not exceed the battery temperature threshold, this indicates that the battery needs to be heated during a charging cycle, and the heater should therefore to be enabled. In that case, operation 860 produces a temperature signal which indicates whether to enable or disable the heater.

In an operation 870, it is determined, based on the temperature signal and the input voltage level signal, which one or more, if any, of the heating elements of the heater are to be activated. In a subsequent operation, the selected heating element(s) is/are then activated.

It should be understood that in other embodiments, the order in which various operations shown in FIG. 8 are performed may be different than that illustrated in FIG. 8. For example, in some embodiments operations 830 and 840 may be performed simultaneous with, or subsequent to, operations 850 and 860. Indeed, in some embodiments, the performance of operations 830 and 840 may be conditioned on the result of operation 850, or operations 850 and 860, such that the operation of determining which one of the plurality of nominal operating voltages is being applied may only be performed in a case where it has been determined that the temperature of a battery does not exceed the battery temperature threshold.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, in some embodiments, the operation of AC voltage level detector 140 may be gated by a signal output by temperature level/threshold detector 150 such that AC voltage level detector 140 only determines the applied nominal operating voltage across first and second input terminals 10 and 12 when temperature level/threshold detector 150 has determined that the temperature of battery 130 does not exceed the battery temperature threshold, and therefore heater 180 needs to be activated. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, the word "substantially" means within 5%, the word "approximately" means within 10%, and the word "about" means within 25%.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
   first and second input terminals configured to be connected to a charging power source for charging a backup power supply for an emergency lighting system and to receive an input voltage from the charging power source across the first and second input terminals, the input voltage corresponding to an applied nominal operating voltage of the charging power source among a plurality of nominal operating voltages for the emergency lighting system, each nominal operating voltage corresponding to a type of AC mains;
   a voltage level detector configured to produce, in response to the received input voltage, an input voltage level signal indicating the applied nominal operating voltage of the charging power source to which the input voltage corresponds;
   a temperature detector configured to determine whether a temperature in a vicinity of the backup power supply exceeds a backup power supply temperature threshold and to produce a temperature signal indicating whether the temperature exceeds the backup power supply temperature threshold; and
   a heater including a plurality of heating elements configured to be selectively activated to heat the backup power supply,
   wherein the temperature signal determines whether the heater is activated, and when the heater is activated the input voltage level signal determines which of the heating elements is/are activated; and
   wherein at least one heating element is configured to be selectively activated while another heating element is configured to be selectively deactivated in response to the temperature signal and input voltage level signal.

2. The apparatus of claim 1, further comprising a switching circuit, wherein the switching circuit is configured to activate the heater when the temperature does not exceed the backup power supply temperature threshold.

3. The apparatus of claim 2, wherein the heater has a plurality of voltage inputs and an output terminal, wherein the switching circuit is further configured to selectively connect the first input terminal to a selected one of a plurality of voltage inputs in response to the input voltage level signal when the temperature does not exceed the backup power supply temperature threshold.

4. The apparatus of claim 3, wherein the switching circuit comprises one or more relays configured to activate the heater when the temperature does not exceed the backup power supply temperature threshold, and further configured to connect the first input terminal to the selected voltage input in response to the input voltage level signal when the temperature does not exceed the backup power supply temperature threshold.

5. The apparatus of claim 4, further comprising a logic circuit configured to receive the input voltage level signal and the temperature signal and in response thereto to output one or more control signals for controlling the one or more relays.

6. The apparatus of claim 2, wherein the heater has a plurality of voltage inputs, and an output terminal, wherein at least a first one of the heating elements is connected in series between a first voltage input and a second voltage input, and at least a second one of the heating elements is connected in series between the second voltage input and the output terminal, wherein the output terminal is connected to the second input terminal, and wherein the switching device is configured to selectively connect the first input terminal to one of the plurality of voltage inputs.

7. The apparatus of claim 2, wherein when the heater is activated and the applied nominal operating voltage is a first one of the plurality of nominal voltages, then the switching circuit applies the input voltage across a series combination of first and second heating elements of the heater, and when the heater is activated and the applied nominal operating voltage is a second one of the plurality of nominal voltages, then the switching circuit applies the input voltage across the second heating element and bypasses the first heating element.

8. The apparatus of claim 7, wherein the first nominal operating voltage is 277 VAC, and the second nominal operating voltage is 120 VAC, wherein the heater is configured to dissipate energy at a first power level when the heater is activated and the applied nominal operating voltage is 277 VAC, and wherein the heater is configured to dissipate energy at a second power level when the heater is activated and the applied nominal operating voltage is 120 VAC, wherein the first power level is approximately the same as the second power level.

9. The apparatus of claim 2, wherein when the heater is activated and the applied nominal operating voltage is a first one of the plurality of nominal voltages, then the switching circuit applies the input voltage across a series combination of first, second and third heating elements of the heater, when the heater is activated and the applied nominal operating voltage is a second one of the plurality of nominal voltages, then the switching circuit applies the input voltage across a series combination of the second and third heating element and bypasses the first heating element, and when the heater is activated and the applied nominal operating voltage is a third one of the plurality of nominal voltages, then the switching circuit applies the input voltage across the third heating element and bypasses the first and second heating elements.

10. The apparatus of claim 9, wherein the first nominal operating voltage is 277 VAC, the second nominal operating voltage is 230 VAC, and the third nominal operating voltage is 120 VAC.

11. The apparatus of claim 1, wherein the plurality of nominal operating voltages include at least 120 VAC and 277 VAC.

12. The apparatus of claim 1, wherein the plurality of nominal operating voltages include at least 120 VAC, 230 VAC and 277 VAC.

13. The apparatus of claim 12, wherein the heater is configured to dissipate energy at a first power level when the heater is activated and the input voltage is 305 VAC, and wherein the heater is configured to dissipate energy at a second power level when the heater is activated and the input voltage is 102 VAC, wherein the first power level is less than twice the second power level.

14. The apparatus of claim 1, wherein the heater further includes a thermal protector configured to disable heating of the backup power supply when a temperature in a vicinity of the thermal protector exceeds a heater temperature threshold.

15. The apparatus of claim 1, wherein the temperature detector is configured to vary the backup power supply temperature threshold to provide hysteresis for the temperature signal.

16. A method, comprising:
receiving across first and second input terminals an input voltage from a charging power source for charging a backup power supply for an emergency lighting system, the input voltage corresponding to an applied nominal operating voltage of the charging power source among a plurality of nominal operating voltages for the emergency lighting system, each nominal operating voltage corresponding to a type of AC mains;
determining whether a temperature in a vicinity of the backup power supply exceeds a threshold;
producing a temperature signal indicating whether the temperature exceeds the threshold;
in response to the temperature signal, selectively activating and deactivating a heater comprising a plurality of heating elements;
when the heater is activated, producing an input voltage level signal indicating the applied nominal operating voltage of the charging power source to which the input voltage corresponds, and
selecting, in response to the input voltage signal, one or more of the heating elements to activate to heat the backup power supply;
wherein at least one heating element is configured to be selectively activated while another heating element is configured to be selectively deactivated in response to the temperature signal and input voltage level signal.

17. The method of claim 16, wherein when the temperature does not exceed the threshold, none of the heating elements is activated.

18. The method of claim 16, wherein the heater has a plurality of voltage inputs and an output terminal, the method further comprising selectively connecting the first input terminal to a selected one of a plurality of voltage inputs in response to the input voltage level signal.

19. The method of claim 16, further comprising, when the heater is activated and the applied nominal operating voltage is a first one of the plurality of nominal voltages, applying the input voltage across a series combination of first and second heating elements of the heater, and when the heater is activated and the applied nominal operating voltage is a second one of the plurality of nominal voltages, applying the input voltage across the second heating element and bypasses the first heating element.

20. The method of claim 19, wherein the first nominal operating voltage is 277 VAC, and the second nominal operating voltage is 120 VAC, the method comprising:
the heater dissipating energy at a first power level when the heater is activated and the applied nominal operating voltage is 277 VAC; and
the heater dissipating energy at a second power level when the heater is activated and the applied nominal operating voltage is 120 VAC,
wherein the first power level is approximately the same as the second power level.

* * * * *